United States Patent
Geserich et al.

(10) Patent No.: US 11,293,798 B2
(45) Date of Patent: Apr. 5, 2022

(54) METHOD FOR LENGTH MEASUREMENT OF A FLAT GOOD IN A GOODS PROCESSING SYSTEM, AND ARRANGEMENT FOR IMPLEMENTATION OF THE METHOD

(71) Applicant: Francotyp-Postalia GmbH, Berlin (DE)

(72) Inventors: Frank Geserich, Friedrichsthal (DE); Volker Baum, Berlin (DE)

(73) Assignee: Francotyp-Postalia GmbH, Berlin (DE)

(*) Notice: Subject to any disclaimer, the term of this patent is extended or adjusted under 35 U.S.C. 154(b) by 873 days.

(21) Appl. No.: 15/795,645

(22) Filed: Oct. 27, 2017

(65) Prior Publication Data

US 2018/0120092 A1  May 3, 2018

(30) Foreign Application Priority Data

Nov. 1, 2016 (DE) .......................... 202016106125.3
Jul. 1, 2017 (DE) .......................... 102017006270.6

(51) Int. Cl.
*B65H 7/14* (2006.01)
*G01G 19/00* (2006.01)
(Continued)

(52) U.S. Cl.
CPC ............. *G01G 19/002* (2013.01); *B65H 7/14* (2013.01); *G01B 11/043* (2013.01);
(Continued)

(58) Field of Classification Search
CPC ... B65H 7/02; B65H 7/14; B65H 7/20; B65H 2511/11; B65H 35/0093;
(Continued)

(56) References Cited

U.S. PATENT DOCUMENTS 4,935,078 A * 6/1990 Bergman ................. B65H 5/34
156/360
5,373,363 A 12/1994 Kobayashi
(Continued)

FOREIGN PATENT DOCUMENTS

| DE | 150 699 C | 9/1981 |
| DE | 202016106124 U1 | 12/2016 |
| DE | 202016106125 U1 | 12/2016 |

*Primary Examiner* — Thomas A Morrison
(74) *Attorney, Agent, or Firm* — Schiff Hardin LLP

(57) ABSTRACT

In a method and apparatus for length measurement of a flat good in a goods processing system having first and second stations, each having a sensor in the transport direction of the flat good, a control processor implements a path control and counts encoder pulses of an encoder in the first station. An event is determined by the sensor of the second station, and an associated numerical value Z1 of the encoder pulses is stored in the control processor, as is a numerical value Z2 for a distance between the two sensors is also stored. An additional event is determined by the sensor of the first station, and an associated numerical value Z3 of the encoder pulses is stored. As soon as both events are present, Z2 and the difference $\Delta = Z3 - Z1$ are added by the control processor, and the sum is used to designate the length.

20 Claims, 4 Drawing Sheets

(51) Int. Cl.
*G01G 11/04* (2006.01)
*G01B 11/04* (2006.01)
*G01B 11/06* (2006.01)
*G01G 23/00* (2006.01)
*G01D 5/347* (2006.01)
*G01G 11/00* (2006.01)
*G01G 11/12* (2006.01)

(52) U.S. Cl.
CPC ........ *G01B 11/046* (2013.01); *G01B 11/0691* (2013.01); *G01D 5/347* (2013.01); *G01G 11/003* (2013.01); *G01G 11/04* (2013.01); *G01G 11/12* (2013.01); *G01G 19/005* (2013.01); *G01G 23/00* (2013.01); *B65H 2511/11* (2013.01); *B65H 2701/1311* (2013.01); *B65H 2701/1313* (2013.01); *B65H 2701/1916* (2013.01)

(58) Field of Classification Search
CPC .... B65H 2301/1422; B65H 2701/1916; G03G 15/5029; G03G 15/5025; G03G 19/002; G03G 19/005; G01B 11/04; G01B 11/043; G01B 5/04; G01B 5/043; G01B 21/06

See application file for complete search history.

(56) References Cited

U.S. PATENT DOCUMENTS

| | | | |
|---|---|---|---|
| 5,813,327 A * | 9/1998 | Freeman | B65H 3/042 101/232 |
| 5,990,422 A | 11/1999 | Komori et al. | |
| 6,005,212 A * | 12/1999 | Van Lierde | B65H 3/063 209/586 |
| 6,178,410 B1 * | 1/2001 | Kunde | G07B 17/00193 705/406 |
| 6,364,306 B1 * | 4/2002 | Kunde | B65H 5/025 271/10.01 |
| 7,853,537 B2 | 12/2010 | Moy et al. | |
| 8,965,568 B2 | 2/2015 | Geserich | |
| 8,969,743 B2 * | 3/2015 | Huebier | G01G 19/005 177/145 |
| 8,972,046 B2 | 3/2015 | Mueller et al. | |
| 9,739,656 B2 | 8/2017 | Kieser et al. | |
| 9,764,915 B2 | 9/2017 | Muhl | |

* cited by examiner

METHOD FOR LENGTH MEASUREMENT OF A FLAT GOOD IN A GOODS PROCESSING SYSTEM, AND ARRANGEMENT FOR IMPLEMENTATION OF THE METHOD

BACKGROUND OF THE INVENTION

Field of the Invention

The invention concerns a method for length measurement of a flat goods processing system, and arrangement for implementation of such a method.

Description of the Prior Art

In a goods processing system, stations are arranged for flat goods to be transported therethrough, lying on their sides, such as through an automatic supply station, a dynamic scale and additional stations following in the transport direction. Dimension measurements of the goods are implemented in the automatic supply station and/or the dynamic scale.

The mail route of a franking system is typically formed by a number of individual mail piece processing stations arranged in series. The stations of the mail route of a franking system may be designed individually as modular stations.

The flat goods transported on their sides can be, for example, mail pieces such as letters in envelopes or postcards. When a stack is discussed in the following, this means a letter stack, postcard stack and other stacks of mail pieces that can be individualized. In general, however, other stacked types of flat goods are not precluded.

In the United States, the standard "Letter" formats are to be processed, such as Letter 8½ inch×11 inch (21.59 cm×27.94 cm), Letter 8½ inch×14 inch (21.59 cm×35.56 cm), Letter 14⅞ inch×11.69 inch (37.8 cm×29.69 cm), but also envelopes such as #10 envelope 8⅓ inch×4½ inch (24.1 cm×10.5 cm).

Especially in Germany, the formats B4 (25.0 cm×35.3 cm), B5 (17.6 cm×25.0 cm), B6 (12.5 cm×17.6 cm) and C4 (22.9 cm×32.4 cm), C5 (16.2 cm×22.9 cm), C6 (11.4 cm×16.2 cm) are typical. The sizes of the German paper formats were established in 1922 by the German Institute for Standards (DIN), in the DIN Standard DIN 476. There are letter envelopes in various standard sizes, defined in ISO 269 and DIN 68, largely using existing paper formats. The typical trade designation (DIN long plus) or (C6 long) for C6/5 (11.4 cm×22.9 cm) does not correspond to the standard, but is overwhelmingly used.

A goods processing apparatus for placement and individualization of flat goods is described in German utility model DE 20 2015 102 333 U1 (G3288-DE). The goods processing apparatus may be compact or may be of modular design. At least an individualization module follows a placement module in the transport path. A control computer or processor of the individualization module has an interface that is coupled with an interface of a control processor of the placement module. It has also already been proposed to omit the control processor of the placement module and to have its control function taken over by the control processor of the individualization module.

An individualization station that is upstream of a placement station is described in German utility model DE 20 2016 106 124 U1 (G3292-DE).

A placement station is described in German utility model DE 20 2016 102 202 U1 (G3289-DE), wherein the placement cover has an opening for a transmission means of a light sensor, and wherein the opening is arranged near the alignment wall of the placement station. The placement station has a motor that drives the transport elements of the placement station.

A dynamic scale for flat goods transported on their sides is described in German utility model DE 20 2016 106 125 U1 (G3293-DE), wherein the flat goods pass in succession through a placement station, an individualization station, a dynamic scale and a franking machine.

A supply station whose control processor performs a length measurement with the participation of a sensor of the supply station, which detects the leading edge and the trailing edge of a transported flat good during the transport, is described in the German utility model DE 20 2012 011 877 U1 (G3279-DE), wherein the encoder clock pulses are counted and evaluated, and a difference is calculated between the high and low count values. However, a disparity known as a "slippage" occurs, because only the movement of the appertaining roller can be directly measured with the encoder signals, but not the movement of the flat good itself. In the case of a gap that is too small between the successive mail pieces, the individualization process is stopped in order to enlarge the gap.

German utility model DE 20 2012 011 876 U1, discloses an automatic feed station having a control processor designed for path control and so as to enable a gap between the mail pieces that is too large to be reduced.

In European patent EP 1377897 B2, a letter flow controller is disclosed, which is a modular system in which each module has a sensor and a memory. The system has a time controller that enables a calculation of the time or the time window in which an envelope should arrive. For example, the lengths of envelopes may be detected by the leading and trailing edge being detected in the first module. Here as well, the aforementioned slippage problem occurs.

In the commercially available Centor franking system with dynamic scale, the letter length is determined solely by the automatic supply station. Thus a separate encoder and a separate photoelectric barrier are provided. As soon as a letter breaks the photoelectric barrier with its leading edge, the encoder signals begin to be counted. The counting ends as soon as the trailing edge of the mail piece clears the photoelectric barrier. The length of the mail piece results from the total number of encoder signals, converted into millimeters. Since a dedicated roller with the encoder, which rotates that runs on the mail piece without driving, it is used, measurement errors due to "slippage" may be minimized. Here as well, however, measurement errors may occur, for example in the placement of the roller on the mail piece and upon removal of the roller from the mail piece. Specifically in the case of thick-edged mail pieces, sharp shocks occur, both upon the leading edge of the mail piece running into the roller and upon the mail piece exiting from the roller.

SUMMARY OF THE INVENTION

An object of the invention is to provide certain length measurement for an automatic supply station with a path controller that ensures that a flat good is transported nearly without slippage, wherein the length measurement is based on the counting of encoder pulses of the transport drive of the automatic supply station.

A cost-effective and capable length measurement should also be developed with which the letter length may be sufficiently precisely measured, given all typical letter formats from postcard to B4 format, in order to be able to implement a correct postage calculation using the measured letter length. Furthermore, the measurement must be concluded promptly before the beginning of printing in the franking machine so that sufficient time is available for format-dependent and weight-dependent postage calculation before the beginning of printing.

The goods processing system in accordance with the invention has at least one first station and one second station, the second station being downstream of the first station in the transport direction of the flat goods. Each of the stations has at least a motor, an encoder and a sensor, which are connected with a control processor. The control processor is programmed to implement path control of the flat goods.

The method according to the invention for length measurement of a flat good in such a goods processing system has the following steps.

An encoder pulse counter is provided in the control processor of the first station, and the encoder pulses of the encoder of the first station are counted by this encoder pulse counter.

An event is determined by a first sensor of the second station, and an associated numerical value Z1 of the encoder pulse counter is stored in a first register of the control processor of the first station.

A numerical value Z2 for a distance d between two sensors is stored in a second register of the control processor of the first station, wherein the two sensors belong to different stations.

An event is determined by the sensor of the first station, and an associated numerical value Z3 of the encoder pulse counter is stored in a third register of the control processor of the first station.

Addition of the numerical value Z2 and the difference $\Delta=Z3-Z1$ of the counter states Z3 and Z1 takes place in the control processor of the first station as soon as both events are present. This sum is used to derive the length of the flat good in the transport direction, and an electrical signal representing that length is emitted as an output from the control processor.

An arrangement to implement the method in a goods processing system includes the following:

A sensor is provided in the first station to determine an event, and an encoder pulse counter is provided in the control processor of the first station, wherein the encoder pulse counter is designed to count the encoder pulses of the encoder of the first station, and the event corresponds to an associated numerical value Z3 of the encoder pulse counter.

A first sensor is provided in the second station to determine another event and, in a first register of the control processor, of the first station an associated numerical value Z1 of the encoder pulse counter is stored, and a numerical value Z2 for a distance d between two sensors is stored, a second register of the control processor of the first station wherein the sensors belong to different stations.

A third register is provided in the control processor of the first station in which is stored the determined numerical value Z3 of the encoder pulse counter that is associated with the event detected by the sensor of the first station.

The control processor of the first station is programmed to add the numerical value Z2 and the difference $\Delta=Z3-Z1$ of the counter states Z3 and Z1, with the sum being calculated as soon as both events are present. This sum is used to derive the length of the flat good in the transport direction, and an electrical signal representing that length is emitted as an output from the control processor.

The event that is determined by the sensor of the first station concerns the detection of the trailing edge of the flat good, and the event that is determined by the sensor of the second station concerns to the detection of the leading edge of the flat good.

The automatic supply station of the commercially available PostBase franking machine, which has two drives that are each provided with an encoder, has been evaluated as to whether and what additional measures might remedy the deficiencies in the length measurement of mail pieces. In the automatic supply station thereof, an individualization roller is driven by a first motor and two transport rollers are arranged in series in the transport path and driven by a second motor of the automatic supply station. Photoelectric barriers are used as sensors, wherein a photoelectric barrier of the first station detects the event if the trailing edge of the flat good clears the photoelectric barrier, and a photoelectric barrier of the second station detects the event if the leading edge of the flat good reaches the photoelectric barrier.

The evaluation yielded that the encoder of the first motor for driving the individualization roller is well-suited for length determination because—due to the overall system design—there are too many circumstances under which, although the individualization roller moves, the driven mail piece cannot be moved to the same extent without "slippage". This slippage effect also cannot be exactly determined and subtracted.

It has been empirically found that the encoder of the second motor may be used to drive the transport rollers for length measurement, but only when (and as long as) a flat good is also gripped by the second transport roller or drum arranged in the transport direction; only then is it ensured that the flat good is transported nearly without slippage.

In an embodiment of the invention in a dynamic scale, three of the above-described arrangements are provided in order to determine the three dimensions of the flat good, and these arrangements for length measurement are situated only in part within the dynamic scale.

The dynamic scale already has a sensor or photoelectric barrier, which can be put to use so that the arrangements for determining the length of the flat good can be only partially situated within the dynamic scale.

Additional components for determining the length of the flat good are provided in the automatic supply station, upstream of the dynamic scale, such as the encoder pulse counter of the control processor and the program stored in a program memory, as well as stored data, at least the data that reflect a distance d between the photoelectric barriers of two immediately adjacent stations.

In contrast to the letter flow controller according to European patent EP 1377897 B2, the PostBase franking system of Francotyp-Postalia GmbH does not use an additional controller but rather a path controller. Each module likewise has at least one sensor. The distance between two sensors or photoelectric barriers is stored as a numerical value or as a number of encoder pulses in a memory of the control processor of the individualization station, wherein the sensors belong to different modules. The sum of the encoder pulses for the length of the distance between two sensors and of the difference of the counter states of the encoder of the transport drive in the cited sensor events or photoelectric barrier events yields a number of encoder pulses that corresponds to the length of the flat good.

With a function $\lambda$ or k, the number of encoder pulses can be converted into a length with a predetermined measurement unit for a flat good, so its length may then be indicated in mm or in cm, for example.

DESCRIPTION OF THE PREFERRED EMBODIMENTS

Figure 1:
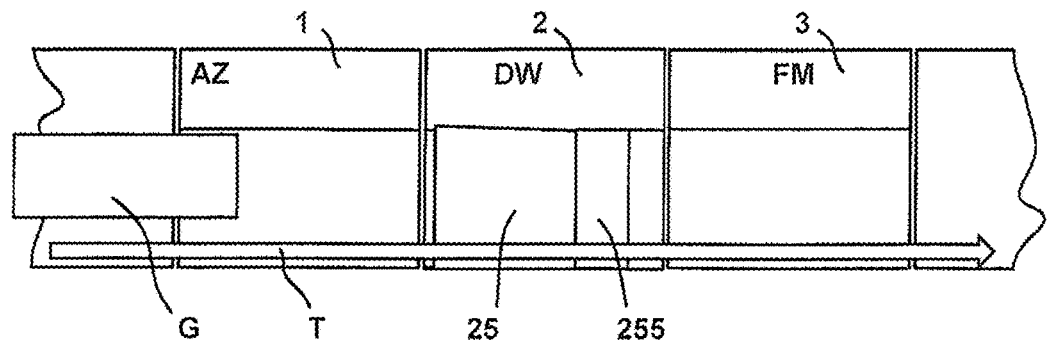
FIG. 1 is a simplified, schematic plan view of stations of a known goods processing system.

FIG. 1 shows a simplified, schematic plan view of stations of a known goods processing system. A flat good G is transported along a transport path T and traverses multiple stations of the goods processing system. Given multiple flat goods that are transported in succession, a goods flow is also discussed. A first station 1 is placed in front of a second station 2, the dynamic scale (DW), upstream in terms of goods flow. A weighing plate 25 of the dynamic scale has a trapezoidal footprint with two non-parallel lateral legs. A cover 255 installed on the weighing plate is provided for a width sensor (not shown). A third station 4 is arranged downstream in terms of goods flow, thus after the dynamic scale (DW) in the transport path T. For example, in a franking system the first station 1 includes an individualization station for the automatic supply of individualized flat goods; the station is therefore also called an automatic supply station in the following. The third station 3 is a franking machine (FM).

Figure 2:
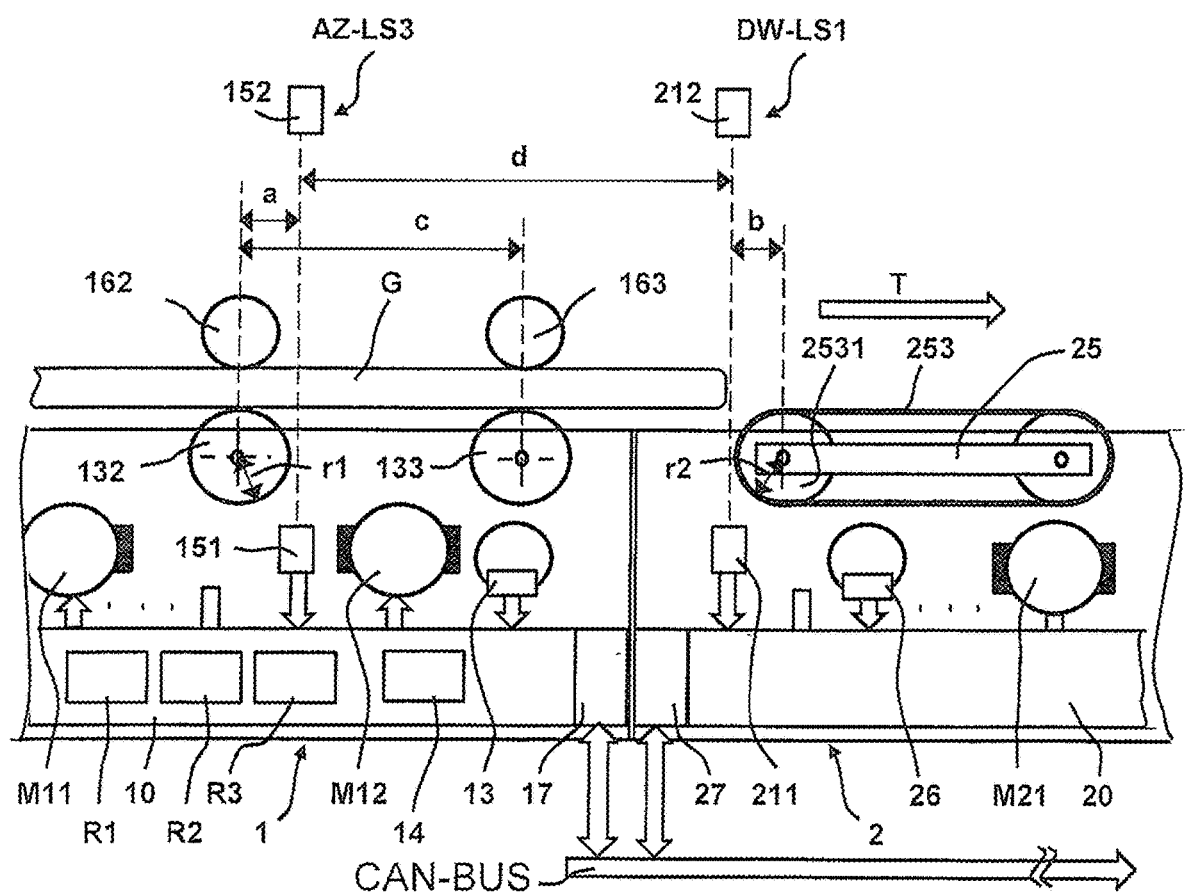
FIG. 2 schematically shows an arrangement of modules for the automatic supply and the dynamic scale for simplified presentation of the principle of length measurement.

FIG. 2 schematically shows an arrangement of modules of the automatic supply station and of the dynamic scale for a simplified presentation of the principle of length measurement. A control processor 10 of the automatic supply station (station 1) has a number of registers R1, R2, R3; an encoder pulse counter 14; and an interface 17. For at least activation, the control processor 10 is connected with: a first motor M11 to drive an individualization roller (not shown); a second motor M12 to drive a first transport roller 132 and a second transport roller 133, as well as for signal reception; an encoder (not shown) of a first motor M11; an encoder 13 of the second motor M12; and a number of sensors S1, S2, . . . , Sn (not shown). A third sensor S3 of the automatic supply station is designed as a photoelectric barrier AZ-LS3 and is comprised of a transmitter 151 and a receiver 152. The light beam travels in the z-direction (see FIG. 3), thus orthogonal to the transport direction y and to the direction x of the axle of the first transport roller 132, closely past and downstream of a first contact pressure roller 162, at a distance a from the axle of the first transport roller 132. The distance a is marginally greater than the radius r1 of the first transport roller 132 and is 15.40 mm, for example. An undriven first contact pressure roller 162 is situated opposite the first transport roller 132 in the z-direction, and an undriven second contact pressure roller 163 is situated opposite the second transport roller 133 in the z-direction, wherein both contact pressure rollers are components of a contact pressure box (not shown) that is a component of an individualization station, the weight of which contact pressure box presses from above onto the flat good G.

Additional details of the individualization station arise from the German utility model DE 20 2016 106 124 U1. The flat good G, clamped between the driven first transport roller 132 and the undriven first contact pressure roller 162, is transported further in the transport direction T to a driven second transport roller 133 and an undriven second contact pressure roller 163. The axles of the two driven transport rollers 132 and 133 are parallel to the x-direction and at a distance from one another that is smaller than the length of the smallest format for flat goods G (for mail pieces: $L_{min}$=140 mm). For mail pieces, the distance of the two axles is preferably c=135 mm.

An interface 17 of the first station 1 is connected via a Controller Area Network (CAN) with an interface 27 of the second station 2, and with interfaces of additional stations (not shown). CAN is a serial bus system. The CAN bus connects multiple identically authorized control units of the stations of the franking machine system with one another.

Before a length measurement, a control processor of the franking machine 3 (FIG. 1) sends (the manner is not shown) commands to prepare the operation of the individual stations via CAN bus, thus also to the control processor 10 of the first station (automatic supply station) and the control processor 20 of the second station 2 (dynamic scale).

After the evaluation of the length measurement, the control processor 10 of the automatic supply station sends the numerical value of the determined length of a flat good to the control processor (not shown) of the franking machine 3 (FIG. 1) via CAN bus.

The control processor 20 of the dynamic scale is connected with the interface 27; with at least one first motor M21 of the dynamic scale for its activation to drive at least one transport belt 253, and with an encoder 26 of first motor M21 for signal reception; and with a number of sensors (not shown). A first sensor of the dynamic scale is likewise designed as a photoelectric barrier DW-LS1 and is comprised of a transmitter 211 and a receiver 212. The light beam of the photoelectric barrier DW-LS1 travels upstream at a distance b from the axle of a first deflection roller 2531 of the at least one transport belt 253. The light beam travels in the z-direction (FIG. 3), thus orthogonal to the transport direction y and to the direction x of the axle. The distance b is marginally larger than the radius r2 of the first deflection roller.

The two light beams of the photoelectric barrier AZ-LS3 and of the photoelectric barrier DW-LS1 preferably travel parallel to one another. A distance d which is greater than the length of the smallest format $L_{min}$ and smaller than the length $L_{median}$ of a medium format of the flat good exists between the two light beams of the AZ-LS3 and of the photoelectric barrier DW-LS1. A standard format C6/5 for a letter envelope with a medium format, which format is common in Germany, has the trade designation "C6 long", "DL+" or "DLplus" and has a length $L_{median}$=229 mm. The distance d is within a range from 140 mm to 220 mm and is preferably 193 mm. The photoelectric barriers may advantageously be fashioned as transmitted light sensors.

The axles of the deflection rollers of the transport belt are installed on a weighing plate 25, which may be learned together with additional details from German utility model DE 20 2016 106 125 U1.

Figure 3:
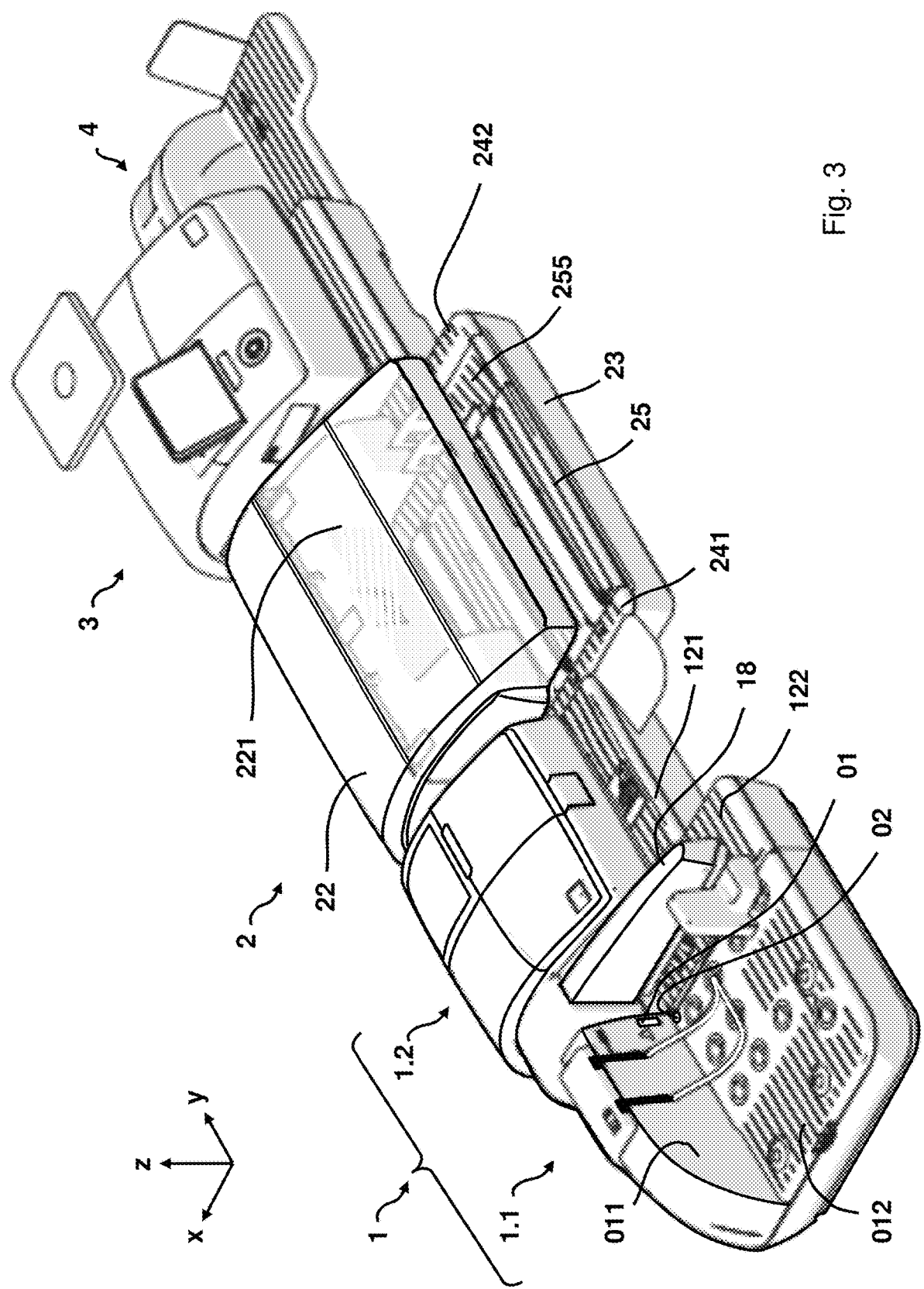
FIG. 3 is a perspective view of the PostBase100 franking system, from the front, above and left.

FIG. 3 shows a perspective depiction of the PostBase100 franking system from the front, above, and left. The first station 1 is an automatic supply station in modular design. Its first module is a placement station 1.1. The placement station 1.1 serves to place individual or stacked mail pieces at the individualization station 1.2 which individualizes the stack. The individualized mail pieces are supplied via a dynamic scale to a franking machine 3 and then are deposited in a tray station 4.

The placement station 1.1 has a sensor (not shown) to detect at least one placed mail piece. The sensor AN-S0 is preferably realized as a photoelectric barrier AN-SL0. An opening 01 in an alignment wall 011 is provided for the receiver of the photoelectric barrier, and an opening 02 in a placement cover 012 is provided for the transmitter of the photoelectric barrier. Additional details are provided in German utility model DE 20 2016 102 202 U1.

The second module of the first station 1 is an individualization station 1.2 having an arm 18 as well as the supply covers 121 and 122. The arm 17 retains those mail pieces of a stack which should only be individualized later. Additional details are disclosed in German utility model DE 20 2016 106 124 U1.

The second station 2 is a dynamic scale having covers 241 and 242, as well as having a semi-transparent, foldable hood 221 of the upper housing part 22. In the lower housing part 23, the weighing plate 25 with an installed cover 255 is formed in the sections between the covers 241 and 242. Components to determine two of the three dimensions of the flat good are preferably entirely components of the dynamic scale, and only components to determine one of the three dimensions of the flat good are partially arranged in the dynamic scale. The first sensor of the dynamic scale, which is designed as a photoelectric barrier DW-LS1, is among the latter.

The third station 3 is a franking machine. As a fourth station 4, a tray for mail pieces is provided after the three stations 1, 2 and 3. The x-direction of a Cartesian coordinate system is transverse to the y-direction, wherein the transport direction coincides with the y-direction. The z-direction is orthogonal to the x/y-plane.

The axles of the two driven transport rollers 132 and 133 are parallel to the x-direction and at a distance from one another that is less than the length of the smallest format (for mail pieces, Lmin=140 mm).

Figure 4:
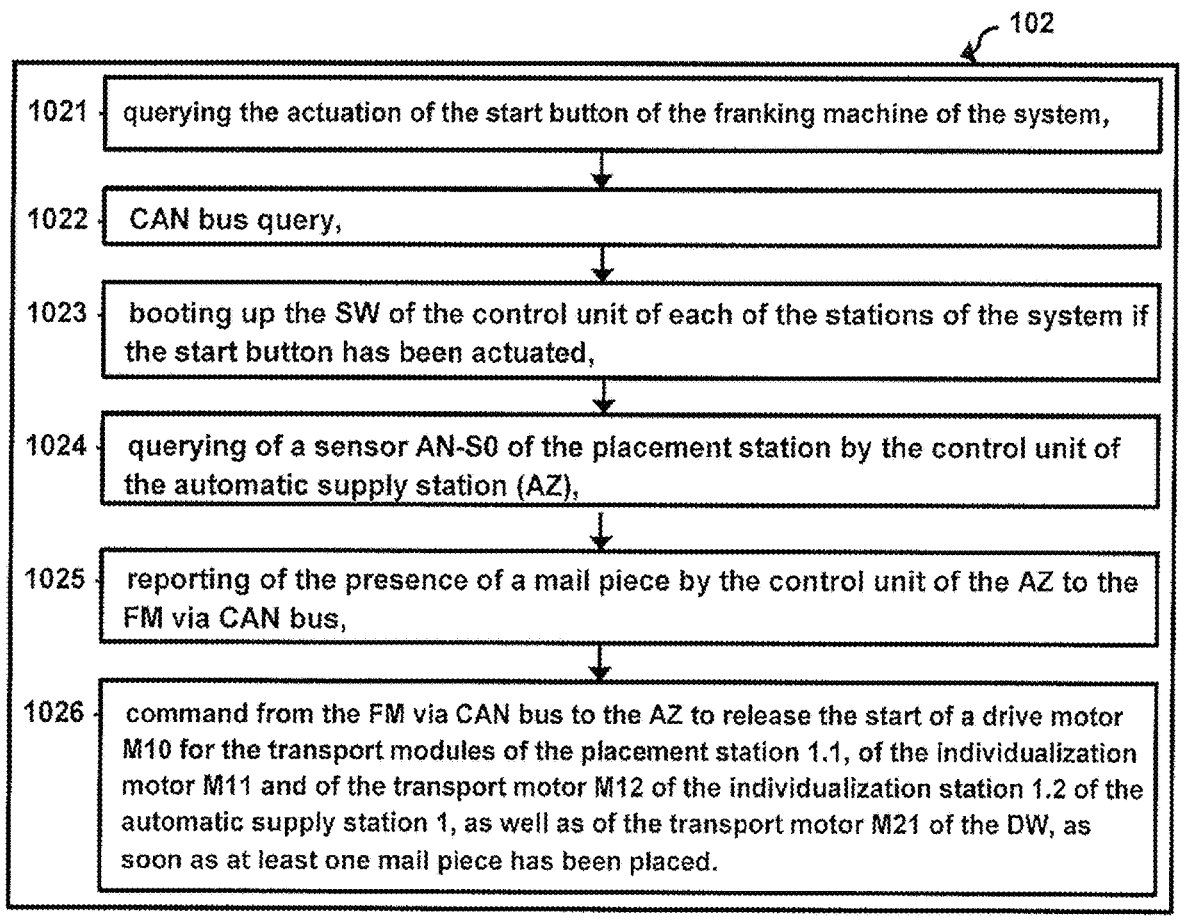
FIG. 4 is a flowchart of steps for preparation of the franking system.
Figure 5:
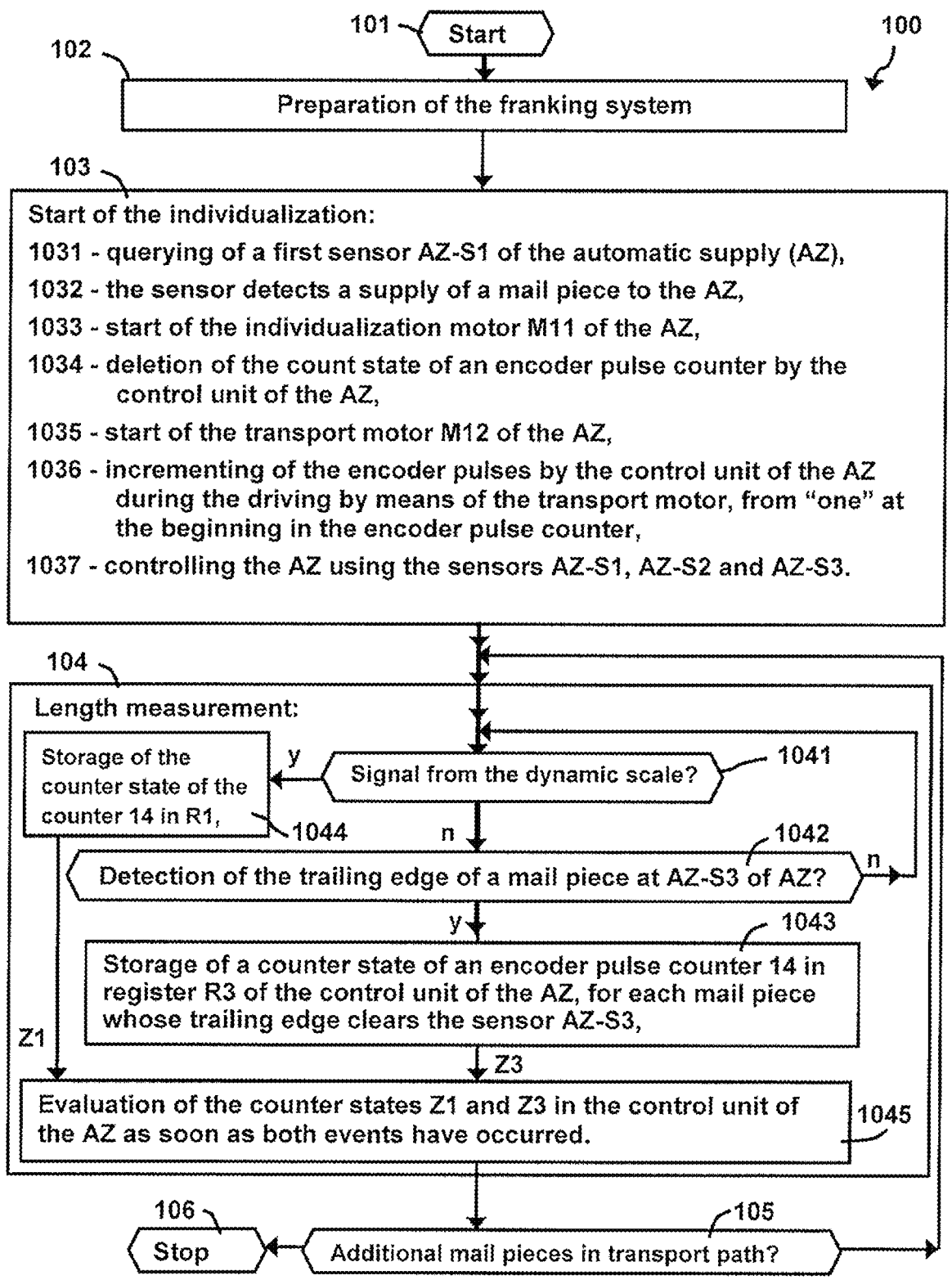
FIG. 5 is a flowchart of a routine of the control processor for automatic supply.

FIG. 5 shows a routine 100 that proceeds in the control processor of the automatic supply and includes a step 102 for preparation of the franking system which is described in more detail using FIG. 4.

FIG. 4 shows a step 102 for preparation of the franking system, including the following sub-steps:

1021—querying the actuation of the start button of the franking machine (station 3) of the system,

1022—CAN bus query and

1023—booting up the SW of the control processor of each of the stations of the system if the start button has been actuated,

1024—querying a sensor S0 of the photoelectric barrier AN-SL0 of the placement station by the control processor of the automatic supply station,

1025—reporting the presence of a mail piece by the control processor of the automatic supply station to the franking machine, via CAN bus,

1026—command from the franking machine via CAN bus to the automatic supply station serves to release the start of a drive motor M10 for the transport modules of the placement station 1.1, of the individualization motor M11 and of the transport motor M12 of the individualization station 1.2 of the automatic supply station 1, as well as of the transport motor M21 of the dynamic scale, as soon as at least one mail piece has been placed.

The routine 100 of FIG. 5 begins with the start 10, followed by the step 102 for preparation of the franking system and with a step 103 to start the individualization. Step 103 includes the following sub-steps:

1031—querying a first sensor AZ-S1 or photoelectric barrier AZ-SL1 of the automatic supply (AZ),

1032—the sensor AZ-S1 detects a supply of a mail piece to the AZ,

1033—start of the individualization motor M11 of the AZ,

1034—deletion of the count state of an encoder pulse counter by the control processor of the AZ,

1035—start of the transport motor M12 of the AZ,

1036—incrementing the encoder pulses by the control processor of the AZ during the driving by means of the transport motor, from "one" at the beginning in the encoder pulse counter,

1037—controlling the AZ using the sensors AZ-S1, AZ-S2 and AZ-S3 or photoelectric barriers AZ-SL1, AZ-SL2 and AZ-SL3.

Following after step 103 is a step 104 to implement the length measurement. In a first query step 1041, a query is made as to whether a signal from the dynamic scale is present. The workflow branches to a sub-step 1044 if a signal from the dynamic scale is present. For every mail piece that covers the photoelectric barrier DW-LS1 with the leading edge, the dynamic scale signals this event in real time per CANopen. Given a signal from the dynamic scale, a count state Z1 of the encoder pulse counter 14 is read out in the automatic supply station and stored in the register R1.

Otherwise, if a signal from the dynamic scale is not present, a second query step 1042 is reached in which a query is made as to whether a detection of the trailing edge of a mail piece at the photoelectric barrier AZ-SL3 has been performed by the control processor of the automatic supply station. The workflow branches back from the second query step 1042 to the beginning of step 104 in the event that the queried event has not yet occurred. Otherwise, in the event that the queried event has already occurred, the workflow branches to a sub-step 1043. In sub-step 1043, a storage in the register R3 of the control processor of the automatic supply station takes place for a counter state of an encoder pulse for each mail piece whose trailing edge clears the photoelectric barrier AZ-SL 3. A count state Z3 of the encoder pulse 14 is thus present in the register R3 if the event has occurred. In sub-step 1045, an evaluation of the stored counter states of the encoder pulse 14 is performed by the control processor of the automatic supply station if both events have occurred.

After step 104, the routine implements a query step 105 with the query of whether additional mail pieces are present in the transport path. The workflow branches back to the beginning of step 104 if this is applicable and at least one additional mail piece is present in the transport path. Otherwise, the workflow branches to the stop at step 106 if no additional mail piece is present in the transport path.

The sub-step 1044 includes the storage of the count state Z1, and the sub-step 1043 includes the storage of the count state Z3 of counter 14, in two registers R1 and R3. A fixed numerical value for the constant distance D is stored in an additional register R2. FIG. 5 shows the sub-step 1045 for evaluation, which only takes place when both events have occurred.

There are now two scenarios for the length determination:

I. The mail piece is longer than or just as long as the distance d between AZ-LS3 and DW-LS1, II. The mail piece is shorter than the distance d between AZ-LS3 and DW-LS1.

Scenario I:

The leading edge of the mail piece first reaches the photoelectric barrier DW-LS1 in the dynamic scale. The encoder pulse counter 14 increments the encoder pulses further. At the point in time of the closing of the photoelectric barrier DW-LS1 in the dynamic scale, the counter state Z1 is therefore smaller than or equal to the counter state Z3 at the point in time of the opening of the photoelectric barrier AZ-LS3 in the automatic supply station.

Calculation Variant I.1:

The distance d is stored as a numerical value in the register R2 and corresponds to the distance in mm. The numerical value Z1 for the number of encoder pulses that is stored in the register R1 is subtracted from the other numerical value Z3 for the number of encoder pulses that is stored in the register R3, and—multiplied with an arbitrary conversion factor $\delta$—yields a path length $\delta \cdot \Delta$ in the desired measurement unit. The difference $\Delta = Z3 - Z1$ of the numerical values Z3 and Z1 is, for example, converted by means of a conversion factor k into a numerical value for a path length in mm that corresponds to the difference $\Delta$. A path s in mm that is traversed per encoder clock is known for the mail piece. For example, the encoder delivers 8.97 signals per millimeter of path, thus the traversed path per encoder clock is $s = 1/8.97$ mm $= 0.1115$ mm. The conversion factor is thus $k = 0.1115$. This path length, calculated with a measurement unit in mm, is added to the numerical value (measurement unit likewise in mm) for the distance d between AZ-LS3 and DW-LS1 and yields the length $d + k \cdot \Delta$ of the mail piece with the measurement unit in mm.

Calculation Variant I.2:

The distance d is stored as a numerical value Z2 in the register R2 and corresponds to a number of encoder clock pulses. The difference $\Delta = Z3 - Z1$ of the numerical values Z3 and Z1 is added to the numerical value Z2 for the number of encoder clock pulses, wherein the number of encoder clock pulses corresponds to the distance d between AZ-LS3 and DW-LS1. The sum $Z2 + \Delta$ of the numerical values Z2, Z3 and Z1 is converted by means of a conversion factor k into a numerical value for a path length $k \cdot (Z2 + \Delta)$ that corresponds to the length of the mail piece in mm.

Calculation Variant I.3:

Alternatively, the sum $Z2 + \Delta$ of the numerical values Z2, Z3 and Z1 are converted by means of a conversion factor $\lambda$ into a numerical value for a path length $\lambda \cdot (Z2 + \Delta)$ that corresponds to the length of the mail piece in a different measurement unit, for example cm.

Scenario II:

The trailing edge of the mail piece first reaches the photoelectric barrier AZ-LS2 in the automatic supply station. The encoder pulse counter 14 increments the encoder pulse counters. Therefore, the counter state Z1 at the point in time of closing of the photoelectric barrier DW-LS1 in the dynamic scale is greater than the counter state Z3 at the point in time of the clearing of the photoelectric barrier AZ-LS3 in the automatic supply station.

Calculation Variant II.1:

The distance d is stored as a numerical value in the register R2 and corresponds to the distance in mm. The difference $\Delta = Z1 - Z3$ of the numerical values is converted by means of a conversion factor k into a numerical value for a path length with the measurement unit in mm that corresponds to the difference. The path s per encoder clock is known. The difference $\Delta = Z1 - Z3$ of the numerical values Z3 and Z1, converted into a path length $k \cdot \Delta$, is subtracted from the distance d between AZ-LS3 and DW-LS1 and yields the length of the mail piece with the measurement unit in mm. Since the equation $L = d - k(Z1 - Z3) = d + k(Z3 - Z1)$ applies, the numerical value for difference $\Delta = (Z3 - Z1)$, multiplied by k, will consequently again yield a path length with the desired measurement unit which, added to the numerical value for the distance d between AZ-LS3 and DW-LS1, yields the length of the mail piece with the measurement unit in mm.

Additional alternative calculation variants II.2 and II.3 are likewise possible, wherein a conversion by the use of a conversion factor k or $\lambda$ or $\delta$ into a numerical value that corresponds to the distance d in mm or in cm or in another measurement unit takes place only at the conclusion. Alternatively, a conversion into inches or into another measurement unit may thus take place with a different conversion factor.

Figure 6:
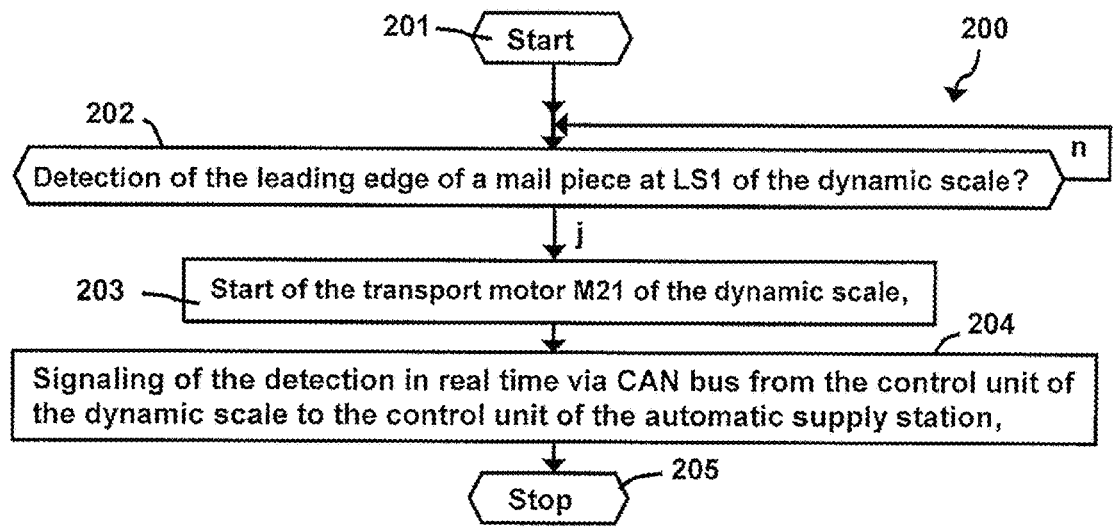
FIG. 6 is a flowchart of another routine of the control processor of the dynamic scale.

FIG. 6 shows a routine 200 that proceeds in the control processor of the dynamic scale. The routine 200 begins with the start 201, followed by a query step 202 to query whether a detection of the leading edge of a mail piece has taken place at the photoelectric barrier DW-LS1 of the dynamic scale. If that is the case, a start of the transport motor M21 of the dynamic scale is triggered in step 203. Otherwise, the workflow branches back to the beginning of step 202. If a step 204 for the signaling of the detection in real time via CAN bus from the control processor of the dynamic scale to the control processor of the automatic supply station follows step 203, the routine 200 is stopped in step 205. However, the control processor of the dynamic scale continues to execute another routine, for example for determining the dimensions such as width, height and weight. The routine 200 is restarted if an additional flat good is separated from a stack by the automatic supply station and is transported to the dynamic scale.

The length measurement described for a franking system is also suitable for other goods processing systems. Such systems do not necessarily need to have an automatic supply station as a first station and a dynamic scale as a second station.

In the above exemplary embodiment, photoelectric barriers are used as sensors; however, alternative sensors such as tactile sensors etc. should not be precluded. Sensors should preferably be used that are adapted to the type and manner of a detection of the flat good.

If the term "register" is used in the present example, another embodiment should not thereby be precluded. The method would also function if the numerical values would be stored anywhere in a volatile memory, and not in the processor registers.

Although a specific embodiment—namely a franking system with a first sensor of a dynamic scale according to a first variant—has been explained in detail in the present example, a different embodiment with a different second station according to an additional variant that may be used based on the same fundamental ideas of the invention.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for length measurement of a flat good in a goods processing system comprising a first station and a second station that is downstream of said first station in a transport direction of the flat good, wherein each of the first and second stations comprises a motor, an encoder that produces encoder pulses representing operation of the motor, an event sensor, and a control processor configured to implement path control of the flat good proceeding through the respective station, said method comprising:

in an encoder pulse counter of the control processor of the first station, counting encoder pulses produced by the encoder of the first station;

detecting an event relating to transport of the flat good in the second station with the event sensor in the second station, and storing an associated numerical value Z1 of the encoder pulse counter, which exists upon detection of said event, in a first register of the control processor of the first station;

storing a numerical value Z2 in a second register of said control processor of said first station representing a distance between the respective event sensors of said first and second stations;

detecting an event in said first station with the event sensor of said first station, and storing an associated numerical value Z3 of the encoder pulse counter that exists upon occurrence of the detection of said event in said first station; and forming a difference $\Delta=Z3-Z1$ in said processor of said first station, and generating a sum $Z2+\Delta$ in said control processor of said first station, as soon as said event in said first station and said event in said second station are both detected, and emitting said sum from said control processor of said first station as a representation of the length of said flat good.

2. A method as claimed in claim 1 wherein said flat good has a format that has a defined smallest format and a defined median format, and comprising placing the respective event sensors in said first station and said second station at a distance apart that is greater than a length of said minimum format and smaller than a length of said median format.

3. A method as claimed in claim 1 wherein said event in said first station detected by said event sensor of said first station is detection of a trailing edge of said flat good passing said event sensor as said flat good is transported through said first station, and wherein said event in said second station detected by the event sensor of the second station is detection of a passage of a leading edge of said flat good passing said event sensor in said second station as said flat good is transported through said second station.

4. A method as claimed in claim 3 wherein each of said event sensors in said first and second stations is a photoelectric barrier, and wherein said photoelectric barrier in the first station detects said trailing edge of said flat good when said trailing edge clears said photoelectric barrier in said first station, and wherein said photoelectric barrier of said second station detects said leading edge of said flat good when said leading edge reaches said photoelectric barrier in said second station.

5. A method as claimed in claim 1 wherein said numerical value Z2 stored in said second register is a number of encoder pulses that corresponds to a distance between the respective event sensors of said first and second stations.

6. A method as claimed in claim 1 comprising, in said control processor of said first station, converting said sum into a designation of said length of said flat good by multiplying said sum by a conversion factor that converts said sum into a length expressed in length units defined by said conversion factor.

7. An apparatus for length measurement of a flat good in a goods processing system comprising a first station and a second station that is downstream of said first station in a transport direction of the flat good, wherein each of the first and second stations comprises a motor, an encoder that produces encoder pulses representing operation of the motor, an event sensor, and a control processor configured to implement path control of the flat good proceeding through the respective station, said apparatus comprising:

an encoder pulse counter of the control processor of the first station that counts encoder pulses produced by the encoder of the first station;

said control processor of the first station being configured to detect an event relating to transport of the flat good in the second station with the event sensor in the second station, and to store an associated numerical value Z1 of the encoder pulse counter, which exists upon detection of said event, in a first register of the control processor of the first station;

said control processor of the first station being configured to store a numerical value Z2 in a second register of said control processor of said first station representing a distance between the respective sensors of said first and second stations;

said control processor of the first station being configured to detect an event in said first station with the event sensor of said first station, and storing an associated numerical value Z3 of the encoder pulse counter that exists upon occurrence of the detection of said event in said first station; and said control processor of the first station being configured to form a difference $\Delta=Z3-Z1$ in said processor of said first station, and to generate a sum $Z2+\Delta$ in said control processor of said first station, as soon as said event in said first station and said event in said second station are both detected, and to emit said sum from said control processor of said first station as a representation of the length of said flat good.

8. An apparatus as claimed in claim 7 wherein said flat good has a format that has a defined smallest format and a defined median format, and wherein the respective event sensors are situated respectively in said first station and said second station at a distance apart that is greater than a length of said minimum format and smaller than a length of said median format.

9. An apparatus as claimed in claim 7 wherein said event in said first station detected by said event sensor of said first station is detection of a trailing edge of said flat good passing said event sensor as said flat good is transported through said first station, and wherein said event in said second station detected by the event sensor of the second station is detection of a passage of a leading edge of said flat good passing said event sensor in said second station as said flat good is transported through said second station.

10. An apparatus as claimed in claim 9 wherein each of said event sensors in said first and second stations is a photoelectric barrier, and wherein said photoelectric barrier in the first station detects said trailing edge of said flat good when said trailing edge clears said photoelectric barrier in said first station, and wherein said photoelectric barrier of said second station detects said leading edge of said flat good when said leading edge reaches said photoelectric barrier in said second station.

11. An apparatus as claimed in claim 7 wherein said numerical value Z2 stored in said second register is a number of encoder pulses that corresponds to a distance between the respective event sensors of said first and second stations.

12. An apparatus as claimed in claim 7 wherein said control processor of said first station is configured to convert said sum into a designation of said length of said flat good by multiplying said sum by a conversion factor that converts said sum into a length expressed in length units defined by said conversion factor.

13. An apparatus as claimed in claim 7 wherein said flat good has a format with a defined minimum format, and wherein said first station comprises to transport rollers situated in succession in said first station in the transport direction, said two transport rollers being driven by the motor in said first station, each of said two driven transport rollers having an axle with the respective axles being parallel to the transport direction and spaced at a distance from each other that is smaller than a length of said smallest format of said flat good.

14. An apparatus as claimed in claim 7 comprising a serial bus system that connects the control processors of the first and second stations with each other.

15. An apparatus as claimed in claim 14 wherein said serial bus system is a CAN bus.

16. An apparatus as claimed in claim 7 wherein said flat good is a mail item, and wherein said first and second stations comprise stations in a franking system.

17. An apparatus as claimed in claim 16 wherein said first station is an automatic supply station of said franking machine system and wherein said second station is a dynamic scale of said franking machine system.

18. An apparatus as claimed in claim 7 wherein:
the event sensor of the first station is located between first and second transport rollers, with respect to the transport direction, of the first station that are configured to support the flat good as the flat good moves in the transport direction, the second transport roller being downstream of the first transport roller in the transport direction; and
the event sensor of the second station is located upstream from first and second transport rollers, with respect to the transport direction, of the second station that are configured to support the flat good as the flat good moves in the transport direction, the second transport roller being downstream of the first transport roller in the transport direction.

19. An apparatus as claimed in claim 18 wherein the first and second transport rollers of the second station support a transport belt.

20. An apparatus as claimed in claim 7 wherein the first station is a feeder station and the second station is a dynamic scale.

* * * * *